(12) United States Patent
Powell et al.

(10) Patent No.: US 6,883,500 B2
(45) Date of Patent: Apr. 26, 2005

(54) FUEL PUMP MODULE WITH IMPROVED VAPOR VENT MANIFOLD

(75) Inventors: Patrick Powell, Southfield, MI (US); Kingo Okada, Toyohashi (JP)

(73) Assignees: Denso International America, Inc., Southfield, MI (US); Denso Corporation, Kariya (JP)

(*) Notice: Subject to any disclaimer, the term of this patent is extended or adjusted under 35 U.S.C. 154(b) by 26 days.

(21) Appl. No.: 10/616,027

(22) Filed: Jul. 9, 2003

(65) Prior Publication Data

US 2005/0005916 A1 Jan. 13, 2005

(51) Int. Cl.$^7$ .............................................. F02M 25/08
(52) U.S. Cl. ...................................... 123/519; 123/516
(58) Field of Search ................................ 123/516, 518, 123/519, 520

(56) References Cited

U.S. PATENT DOCUMENTS

| | | | |
|---|---|---|---|
| 5,497,800 A | * | 3/1996 | Ohashi et al. .............. 137/110 |
| 6,343,590 B1 | * | 2/2002 | Nagai et al. ................ 123/518 |
| 6,698,475 B2 | * | 3/2004 | Schaefer et al. ............ 141/325 |
| 2002/0157715 A1 | | 10/2002 | Viebahn |

FOREIGN PATENT DOCUMENTS

| | | |
|---|---|---|
| DE | 200 19 968 U | 2/2001 |
| EP | 1 213 173 A | 6/2002 |
| EP | 1 216 874 A | 6/2002 |
| WO | WO 02/087915 A | 7/2002 |

* cited by examiner

*Primary Examiner*—Weilun Lo
(74) *Attorney, Agent, or Firm*—Harness, Dickey & Pierce, PLC

(57) ABSTRACT

A fuel pump module with integrated vapor vent manifold for minimizing fuel vapor emission in a fuel venting system, comprising a modular flange having a plurality of vapor inlets on the bottom side for receiving fuel vapor from sources both proximal and distal to the flange within the fuel tank. The vapors collected from distal sources within the tank are carried to the manifold by means of internal vent lines thereby minimizing permeation emissions common of external vapor lines. Once received in the manifold, the vapors conglomerate and exit the top side of the flange through a single outlet, connected by a single vapor line to a remote canister for storage.

5 Claims, 2 Drawing Sheets

US 6,883,500 B2

FUEL PUMP MODULE WITH IMPROVED VAPOR VENT MANIFOLD

FIELD OF THE INVENTION

The present invention relates to low-emission fuel tank venting systems. Specifically, the invention relates to a tank-mounted fuel pump module having an integrated manifold for merging multiple vapor sources through a single vapor outlet in the module flange.

BACKGROUND OF THE INVENTION

Controlling fuel vapor in vehicle fuel tanks has long been an objective for automobile manufacturers and suppliers of fuel systems components. Fuel vapor can be created in the fuel tank by temperature differences between the fuel tank and liquid fuel from a fuel pump, as well as by sloshing and agitation of the fuel tank during normal vehicle operation. The vapor collects in various high points within the fuel tank, and is normally released from the fuel tank through one or more vent valves located within the wall of the fuel tank. This prevents pressurization of the tank or the creation of a vacuum therein as a result of fluctuations in fuel volume due especially to changes in temperature or in atmospheric pressure or to the drop in fuel level as the fuel is drawn off.

Once the fuel vapor has been discharged from the fuel tank, the vapor must be adequately stored and/or consumed to assure compliance with air pollution regulations. In some vehicle fuel systems, discharged fuel vapor is exhausted to a charcoal-filled vapor recovery canister designed to capture and store fuel vapor. These so-called "on-board" fuel vapor recovery systems are disclosed, e.g., in U.S. Pat. Nos. 4,770,677; 4,816,045; and 4,836,835. Other systems route the fuel vapor back to the engine, where it is combusted.

Due to the size restraints of the vehicle, the fuel tank may have a complex shape. It often includes pockets in its upper wall, or areas liable to collect fuel vapor when the fuel reaches a high level in the tank and/or when the vehicle is on an incline. Each of these pockets therefore requires a means of venting the collected vapor to the outside of the tank. Multiple ventilation point may be connected directly to the outside of the tank, but due to permeation of fuel vapor through multiple vapor vent lines, increased vapor emissions are eminent.

With the increasing requirements to reduce emissions, it becomes advantageous to route vapor vent lines inside the fuel tank, to a single exit point from the various vapor pockets created within the tank. Doing so reduces permeation emissions by containing multiple vapor lines inside the fuel tank. Furthermore under these increasing regulations to reduce emissions, where multiple vent valves used to be mounted in separate apertures through the fuel tank, it now becomes advantageous to mount them within the fuel pump mounting flange, thereby eliminating the need for additional holes through the tank and potential vapor emission sources.

The need arose for a fuel pump module with an integrated manifold, combining the fuel vapor from multiple sources within a fuel tank, and discharging them through a single outlet port, located on the pump modular flange.

SUMMARY OF THE INVENTION

It is therefore an object of the present invention to provide for a means for reducing permeation emissions of fuel vapor, by eliminating multiple vapor vent lines outside the tank.

It is another object of the present invention to provide for a means of collecting fuel vapor from multiple sources within a fuel tank and merging them into a single outlet located on the fuel pump modular flange.

A further object of the present invention is to provide a means of attaching one or more vapor vents directly to the modular flange, thereby incorporating multiple vapor inlets for fuel vapor collected remotely within the fuel tank.

Another object of the present invention is to reduce fuel vapor emissions from a fuel tank by providing a fuel pump modular flange having one or more vapor valves incorporated within, thereby eliminating the need for additional holes through the fuel tank.

The foregoing objects are achieved by a fuel pump module having an integrated vapor manifold within the mounting flange for the collection and release of fuel vapor accumulated within a fuel tank. The flange combines fuel vapor collected from multiple vapor inlets inside the fuel tank transported to the flange through internal vapor vent lines, and consolidate them into a single outlet through the modular flange. Furthermore, the modular flange provides for a means of attaching one or more vent valves directly to the manifold for merging vapors collected proximal to the flange with those of remote sources within the fuel tank. Once the vapors consolidate within the manifold, they are discharged through a single outlet to a remote located canister outside the fuel tank for storage. By eliminating the need for multiple apertures through the fuel tank and routing fuel vapor lines within the fuel tank, harmful vapor emissions into the atmosphere are significantly decreased.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
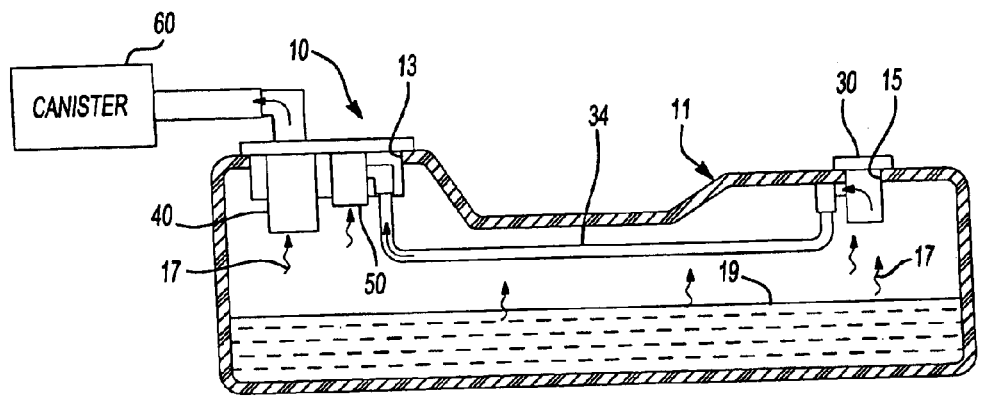
FIG. 1 is a partial-sectional side view of the fuel tank with attached fuel pump module flange and remote vent valve.
Figure 2:
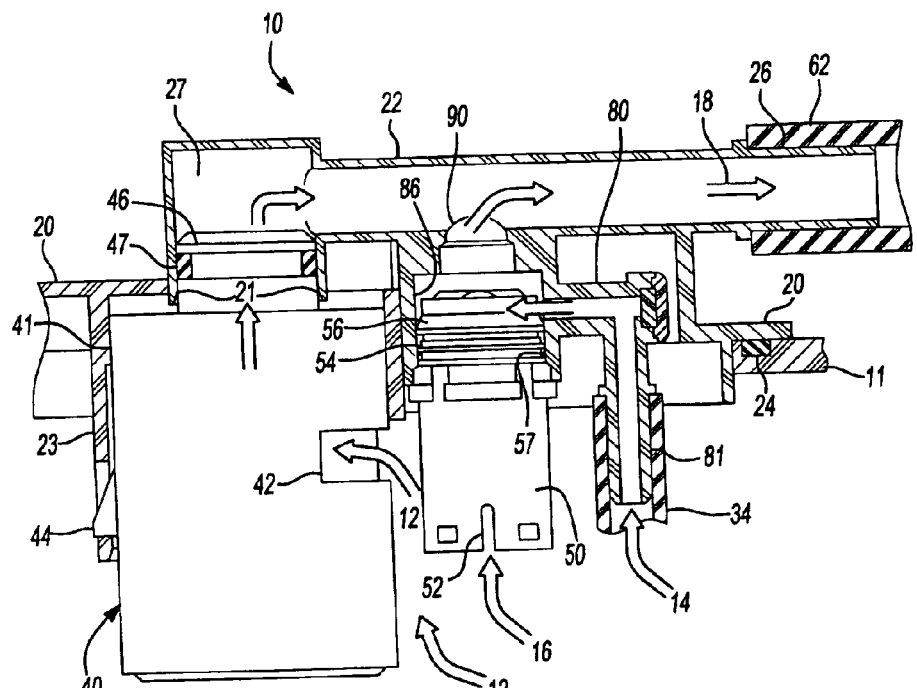
FIG. 2 is a partial-sectional side view of the fuel pump module flange and vapor-vent manifold with plural, integral vent valves.

Referring to the drawings, and particularly FIGS. 1 and 2, the invention consists of a fuel pump module having a modular flange 20 with an integrated fuel vapor manifold 22, for attachment to an automobile fuel tank 11. The flange 20 of the module 10 is attached to an opening in the fuel tank wall 11, and seals the interior volume of the fuel tank from the outside atmosphere. As illustrated, the flange 20 comprises an integrated vapor manifold 22 for the collection of fuel vapor 17 from one or more vent valve inlets within the fuel tank 11 and merges them into a single outlet port 26 leading to a remote vapor storage canister 60 or other desired location. Optionally, the flange 20 is sealed to the fuel tank 11 by a sealing means 24, but the scope of invention is not intended to be limited by the means in which the flange 20 is attached to the fuel tank wall 11.

The manifold 22 integrated into the modular flange 20, consists of a manifold chamber 27 having an aperture at one end passing through the flange 20 defining a receptacle 21, for receiving the interface portion 46 of an attached vent valve 40 on the bottom side of the modular flange 20. In the preferred embodiment, the manifold 22 further defines a secondary vapor inlet 90 wherein the vapor collected from a secondary vent valve 50 or other remote source 14 within the fuel tank 11 enters the manifold 22 and combines with the vapor from the primary vent valve 40. The combined fuel vapors from the multiple of vent valves within the tank 11 illustrated by the arrow 18, merge and exit the manifold 22 through the outlet tube 26 as indicated. The outlet tube 26 attaches to an external vapor tube 62 which carries the fuel vapor to a remote canister 60 for storage, or holding prior to being routed to the engine and burned.

As stated, the flange 20 and incorporated manifold 22 provide for the direct attachment of one or more primary vent valve 40 directly to the bottom side of the flange 20. Each valve 40 is typically cylindrical in shape, and has a vapor inlet 42 wherein fuel vapor 17 travels from the interior of the fuel tank 11 into the valve 40 assembly as shown by the arrow 12. Inside the vent valve 40 but not shown, is a check valve which allows the fuel vapor 17 to exit into the manifold 22 while preventing any fuel 19 that may splash onto the vent valve 40 from traveling up into the manifold chamber 27. The valve 40 further serves to protect against fuel discharge through the vapor system in the event of inadvertently overfilling the tank 11 during refueling.

Best illustrated in FIG. 2, the generally cylindrical interface portion 46 of the upper end of the valve 40 is concisely received by the corresponding valve receptacle 21 located on the manifold 22. The interface portion comprises a vapor passage from the valve 40 to the manifold 22, allowing vapor to pass from the valve 40 into the manifold chamber 27. In the preferred embodiment, a sealing means such as an o-ring 47, is shown implemented in an annular grove on the interface portion 46 of the valve 40 further preventing fuel 19 from passing up into the manifold chamber 27. If the frictional fit between the interface portion 46 of the vent 40, the receptacle 21 on the manifold 22 and the sealing means 47 is tight enough, the valve 40 will be retained securely by the flange 20, wherein further means of attachment may not be necessary.

Figure 3:
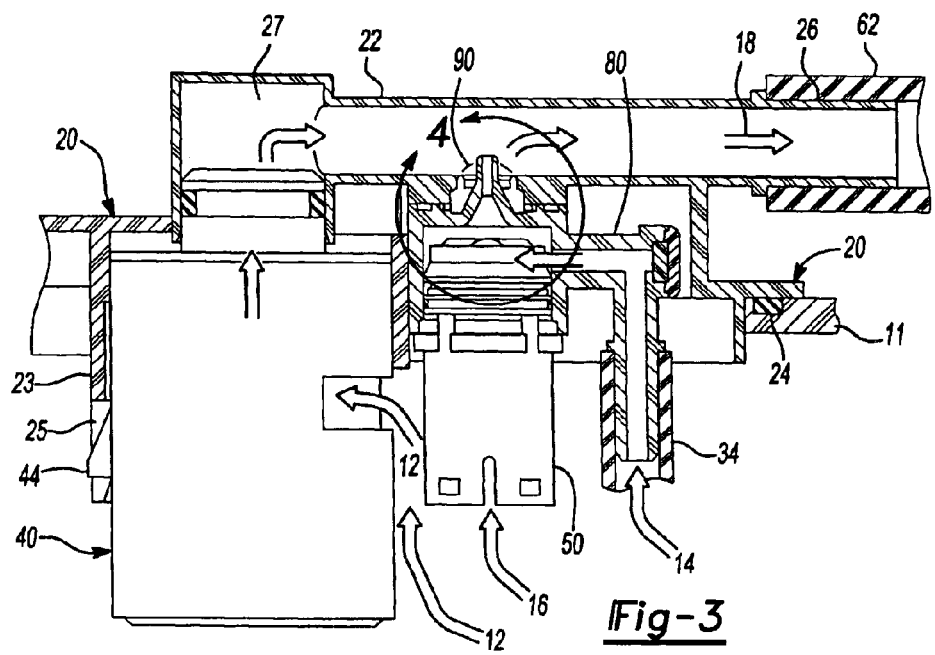
FIG. 3 is a detailed partial-sectional side view of the fuel pump module flange illustrating the junction point of the secondary manifold of FIG. 4.

Alternatively, a second means of attaching the valve 40 to the flange 20 as shown in FIGS. 2 and 3 utilizes a snap-fit design, wherein a wedge-shaped vertical tab 44 on the exterior of the vent valve 40 biases the wall 32 of the flange 20 outward upon contact as the valve 40 is inserted upwards into the receptacle 21. Once fully inserted, the tab 44 is received through an aperture 25 on the wall 32 allowing the wall 32 to snap back to its original position locking the vent valve 40 in position. This snap-fit means of attachment provides a more secure connection between the valve 40 and the modular flange 20, which may be preferable in fuel vent applications that expose the fuel pump module 10 to more severe jarring.

Often times as illustrated in FIG. 1, it is desirable to have a remotely mounted vapor vent valve 30 for the collection of vapor from a portion of a fuel tank 11 distal to the fuel pump modular flange 20 that may be vaporly compartmentalized due to the design of the tank. The remote vent valve 30 may be mounted to the tank 11 through a second aperture 15 in the tank wall or by some other means, but is not intended to limit the scope of the invention. The vent valve 30 discharges vapor to the internal vent line 34 that carries the vapor 17 from the remote valve 30 to the modular flange 20, where it connects to a manifold adapter 80 illustrated in FIG. 4, which attaches to the modular flange 20 at surface 92. The adaptor 80 comprises a vapor chamber 83 defined by walls 82, 84 and 86 which is open on the bottom defining a receptacle for receiving a secondary vent valve 50, attached by similar means as the primary vent valve 40 is attached to the modular flange 20, shown in FIGS. 2 and 3. Additional fuel vapor 17 may enter the secondary vent valve 50 through aperture 52, as indicated by the arrow 16.

Figure 4:
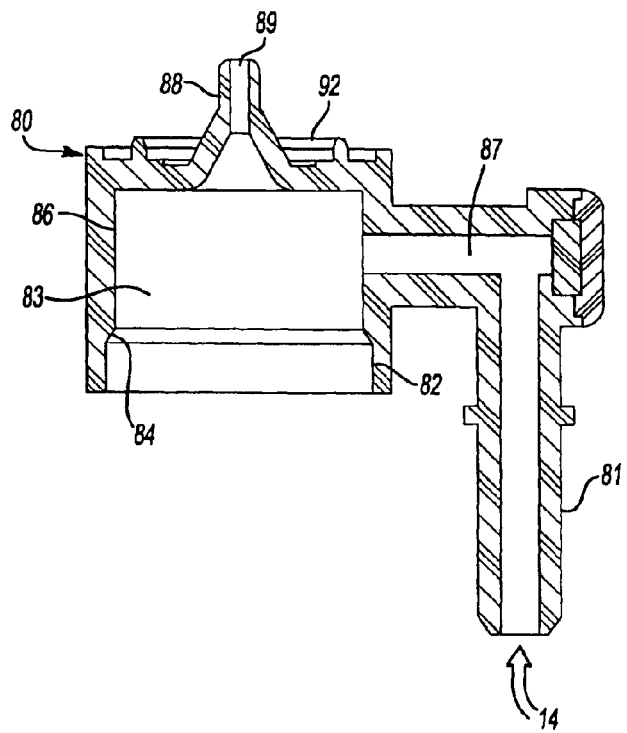
FIG. 4 is a sectional side view of the secondary manifold having a remote vapor inlet, for attachment of a secondary vent valve to the vapor vent manifold.

Referring to FIGS. 3 and 4 together, the manifold adapter 80 comprises a remote vapor inlet tube 87 leading into the vapor chamber 83, which connects with the internal vent line 34 from the remote vent valve 30 at end 81. Fuel vapor which 17 enters the remote vent valve 30, travels into the manifold adapter 80 as indicated by the arrow 14 wherein it merges with vapor collected through the secondary valve 50. The combined vapors exit the manifold adapter 80 through a tapered exit port 89 in the top of the adapter 80, defined by an extended outlet tube 88, terminating within the manifold 22 when attached thereto. The adapter 80 in the preferred embodiment is welded to the underside of the manifold 22, in a manner so as to maintain a small gap or passage around the extended outlet tube 88 as shown in FIG. 3. The extension of the outlet tube 88 provides for a high point of vapor exit from the manifold adapter 80 into the manifold 22, while the gap allows fuel 19 that may inadvertently bypass the primary vent valve 40 to drain back into the tank 11 instead of undesirably entering the internal vent line 34. The fuel vapors collected through arrows 14 and 16, commingle with each other in the manifold adapter 80 before entering the manifold 22 and commingling with the vapors collected through the primary vent valve 40 as indicated by the arrow 12. The combined vapors, now indicated by arrow 18, exit the manifold 22 through the single outlet tube 26 which attaches to the external vapor tube 62, carrying the fuel vapor to canister 60 for storage, prior to being routed to the engine and burned.

There is thus provided a fuel pump module incorporating fuel vapor collected through one or more vapor vent valves both proximal and distal to the modular flange by an integrated manifold having a single outlet, which significantly reduces the potential sources for fuel vapor emissions into the atmosphere.

What is claimed is:

1. A fuel pump module with integrated vapor manifold comprising:

a modular flange for mounting to a fuel tank, the flange having a top side, a bottom side, and a longitudinal manifold for merging fuel vapor received from a plurality of sources within said tank for discharge from said manifold through a single vapor outlet on the top side of the modular flange, wherein at least one source within said tank comprises a primary vent valve attached directly to the bottom side of the manifold, at least one source within said tank comprises a remotely located vent valve attached to the manifold through a concealed internal tank vent line, and wherein fuel vapors collected from said remotely located vent valve merge with vapors collected from a secondary vent valve prior to entering the manifold, and wherein all the vapors enter the manifold from a bottom side of the longitudinal manifold, the longitudinal manifold residing above and parallel to a longitudinal axis of the fuel tank.

2. The fuel pump module with integrated vapor manifold of claim 1 wherein the manifold comprises a means of preventing fuel within manifold from entering internal tank vent line.

3. The fuel pump module with integrated vapor manifold of claim 1 wherein said secondary vent valve is attached proximal the manifold.

4. A fuel pump module with an integrated longitudinal vapor manifold comprising:

a modular flange for mounting to a fuel tank, the flange having a top side, a bottom side, and a longitudinal manifold for merging fuel vapor received from a plurality of sources within said tank for discharge from said longitudinal manifold through a single vapor outlet on the top side of the modular flange, said single vapor outlet located at an end of the longitudinal manifold;

at least one source within said tank comprising a primary vent valve attached directly to the bottom side of the longitudinal manifold;

at least one source within said tank comprising a remotely located vent valve attached to the longitudinal manifold through a concealed, internal tank vent line that is located below a level of the longitudinal manifold and that delivers vapors to the longitudinal manifold from a bottom side of the longitudinal manifold.

5. The fuel pump module with integrated vapor manifold of claim 4 wherein vapors discharged from the vapor outlet at said end of the longitudinal manifold travel through an exterior vapor line to a canister for storage.

* * * * *